United States Patent [19]

Grylls

[11] 3,924,006

[45] Dec. 2, 1975

[54] ACTIVE DRIED YEAST

[75] Inventor: Frederick S. M. Grylls, Morden, England

[73] Assignee: The Distillers Company (Yeast) Limited, Surrey, England

[22] Filed: July 22, 1974

[21] Appl. No.: 490,445

[30] Foreign Application Priority Data

July 23, 1973 United Kingdom............... 34950/73

[52] U.S. Cl. ..................... 426/24; 195/58; 195/74; 426/26; 426/62
[51] Int. Cl.². A21D 2/02; A21D 2/16; C12C 11/18
[58] Field of Search ............ 426/24, 26, 62; 195/74, 195/58

[56] References Cited

UNITED STATES PATENTS

| 3,407,072 | 10/1968 | Aizawa et al. .................. 426/62 |
| 3,448,010 | 6/1969 | Pomper et al. ................ 426/62 X |

*Primary Examiner*—James R. Hoffman
*Attorney, Agent, or Firm*—Lawrence Rosen; E. Janet Berry

[57] ABSTRACT

In the production of dough using active dried yeast, the yeast is first reconstituted in water in the presence of hydrophobic silicic acid and a wetting agent. It is particularly advantageous to use active dried yeast that contains the wetting agent and hydrophobic silicic acid.

11 Claims, No Drawings

ACTIVE DRIED YEAST

It is well-known to produce baker's yeast in dry particulate form, the resultant baker's yeast being known as "active dried yeast". Such yeast has a dry matter content greater then 90% often 93 to 97% by weight. Active dried yeast is made by various methods, for example extrusion into pellet form followed by drum drying or by methods which produce powdered materials, that is to say materials having a much lighter and more powdery texture than the conventional pellets made by drum drying.

In the production of a dough from flour, water and active dried yeast it is necessary that the yeast should be reconstituted. Normally reconstitution is brought about by initially soaking the yeast in water prior to adding flour. Some of the powdered forms of active dried yeast can be reconstituted merely by contact with the flour, optionally in the presence of water.

It has been proposed from time to time that various additives may be added to the yeast either before drying or after drying in order to improve the properties of the yeast, in particular in order to improve the acitivity of the yeast upon reconstitution.

In the invention, in the manufacture of dough using active dried yeast the active dried yeast is, before being mixed with the bulk of the flour to form dough, reconstituted in water in the presence of hydrophobic silicic acid and a wetting agent. Usually the hydrophobic silicic acid is present in the dry yeast. The wetting agent may be included in the water used for reconstitution, for example being dissolved in the water before the yeast is added, but preferably it also is in the active dried yeast. Thus a preferred product according to the invention is an active dried yeast composition formed of yeast that has admixed with it hydrophobic silicic acid and a wetting agent.

The reconstitution liquor may or may not contain flour or other ingredients, but if it contains flour preferably it does not contain the bulk of the flour to be present in the final dough. Thus if flour is present it will preferably be less than 20% preferably less than 10%, by weight based on the weight of water.

We find that as a result of using both hydrophobic silicic acid and a wetting agent it is possible to obtain surprisingly good activity upon reconstitution.

The amount of hydrophobic silicic acid is preferably from 0.05 to 2%, and preferably from 0.1 to 1% based on the dry weight of the yeast. Best results are obtained at 0.1 to 0.5%.

The amount of wetting agent present is usually from 0.05 to 2% preferably from 0.1 to 1% and most preferably from 0.1 to 0.5% based on the dry weight of the yeast.

The wetting agent is preferably an ester, preferably a long chain aliphatic ester of an aliphatic hydroxy compound.

Suitable wetting agents include (1) an ester of a polyglycerol with a saturated fatty acid, (2) an ester of sorbitan with a saturated $C_{16}$ to $C_{18}$ fatty acid or (3) a polyoxy ethylene derivative of (2).

1. may be formed by esterifying a mixture of polyglycerols with a $C_{16}$ to $C_{18}$ fatty acid, for example with palmitic acid or stearic acid or with mixtures consisting predominantly of either or both of these. The resultant product is mainly a monoester although it does contain some di or higher esters and it also contains some, e.g., up to 10%, unesterified fatty acid. A suitable material is sold under the trade name "ADMUL Polyester 57" made by Food Industries Limited and the preparation of this is described in pages 27 and 28 of Process Biochemistry, December 1972.

2. is generally an ester both of sorbitan (this itself being a mixture of 1,4-anhydroglucitol and 3,6-anhydroglucitol), and isosorbide, this being a mixture of 1,4- and 3,6-dianhydroglucitol. The fatty acid used for forming the ester is generally palmitic or stearic acid or mixtures consisting predominantly of either or both of these. The product is mainly a mixed monoester and diester and generally also contains some, e.g., up 2%, 2% fatty acid. The production of suitable esters is described in US Pat. No. 2,322,821. Suitable materials are available under the trade names "SPAN" 40 and "SPAN" 60 made by Atlas Chemical Industries, Inc.

Span 40 contains about 35% or less of each of the mono- and dipalmitate and up to 2% of the free acid, with the balance unreacted sugar alcohol and anhydride. Span 60 contains about 45% or less of each of the mono- and distearate and up to 2% of the free acid, with the balance unreacted sugar alcohols and anhydride.

A particularly suitable product comprises a mixture of esters, for example a mixture of SPAN 40 and Span 60 in the ratio, for example 2:1 to 1:2. 3. is a polyoxy ethylene derivative of the compounds described in (2) and are available under the trade name TWEEN for example TWEEN 40 and TWEEN 60 made by Atlas Chemical Industries, Inc.

The preferred compounds for use in the invention are (2) namely esters of sorbitan with a saturated $C_{16}$ to $C_{18}$ fatty acid.

Hydrophobic silicic acid is available under various trade names, such as Aerosil made by Degussa Inc. and Cab-O-Sil made by Cabot Corporation. It is variously described as being hydrophobic silicic acid or silica, microfine coloidal silica or silicic acid, sub-microscopic or silicic acid, colloidal silica or silicic and fumed silica or silicic acid. The ultimate particle size is usually from 5 to 50 m$\mu$, most usually 10 to 20 m$\mu$. The bulk density of the uncompressed material may be from 10 to 80, usually 30 to 60, grams per litre while the bulk weight of compressed material may be 50 to 150, usually 70 to 100 grams per litre.

Particularly suitable materials are those supplied by Messrs. Bush Beach and Segner Bayley under the designation EP93, EP154 and R972.

The yeast used in the invention can be pellet yeast, for example made by conventional drum drying processes, but is preferably a powdered yeast, for example having a particle size of 1.7 mm or less.

One preferred process for making powdered yeast comprises spray drying a liquid yeast composition in air, optionally followed by further drying. 40%, example, a liquid yeast may be spray dried to a moisture content of, for example, 40 to 50% dry matter and may then be further dried by, for example, fluidised bed drying. Such a process is described in British Pat. Specification No. 1,196,786.

Another preferred method for making powdered yeast comprises comminuting moist yeast, for example having a dry matter content of 27 to 40% under conditions of high shear. For example the yeast may be comminuted in a mill, for example containing blades that rotate at a speed greater than 2,000 r.p.m., followed by drying. Suitable comminution methods are described in British Pat. Specification No. 1,140,016 and Belgian Patent Specification No. 797062 (equivalent to British Pat. Application No. 41144/72).

If the wetting agent is admixed with the active dried yeast then it may be added to the yeast at any convenient stage, but normally it is added to the yeast before drying, i.e., while it has a dry matter content of less than 40% and usually less than 30%. For instance, when the yeast particles are to be made by forming a yeast cake from a cream and then converting this into particulate form it is preferred that the wetting agent should be added before the particles are formed, e.g., to the cake or cream, while if the particles are to be made by spray drying a cream the wetting agent is preferably included in the cream. The wetting agent may conveniently be added to the cake or cream in the form of a solution or emulsion.

It is possible to add the hydrophobic silicic acid to the yeast before drying the particles, e.g., by scattering it onto a yeast cake before comminution or by scattering it onto the particles after they have been formed but before they have been dried to form active dried yeast, e.g., while they have a high moisture content. Preferably however the hydrophobic silicic acid is added to previously formed active dried yeast. Thus the wetting agent is preferably added to moist yeast, a particulate (and preferably powdery) active dried yeast composition is formed by drying and the hydrophobic silicic acid is added subsequently. Any convenient method of addition that involves gentle blending may be used provided it ensures uniform distribution of the hydrophobic silicic acid through the yeast composition. For example it may be scattered onto the yeast particles and/or gently stirred into the mass of yeast particles.

It is particularly surprising that gently blending of the 9%. acid with the dried yeast results in the significant improvement in activity that is obtained, since 0.2% the weight, based on the dry silicic acid is probably solely on or in contact with the outer surfaces of the yeast particles. However it is very advantageous that the improved activity can be obtained by this method since the method is commercially much more convenient to operate than one in which the hydrophobic silicic is added to the yeast before drying.

EXAMPLE 1

Yeast was propagated in conventional manner from strain GB4252 and had a nitrogen content of about 9% The yeast cream obtained from the propagation step was centrifuged and to the product was added 0.2% dry weight, based on the day weight of the yeast, of a mixture of 3 parts SPAN 40 and 2 parts SPAN 60. The product was filtered under pressure to form a cake which was disintegrated in a mill for from 10 to 15 15 in the general manner described in Belgian Pat. Specificaion No. 797062. The particulate product was sieved through a BS No. 30 mesh sieve and the particles passing through the sieve were dried in a fluidised bed drier under conditions such that the yeast acquired a temperature of about 30°C for 20 minutes. The dried yeast had a dry matter content of 93.9%. It was sieved through a 425 micron sieve. 0.2%. based on the dry matter content of yeast, hydrophobic silicic acid Type EP93 (ex Messrs. Bush, Beach and Segner Bayley) was added and was mixed into the active dried yeast by agitation.

The active dried yeast was reconstituted by adding 1.8 gram of the yeast to 40 ml deionised water and soaking the product for 15 minutes, adding 20 ml salt solution containing 13.5% sodium chloride and 1.0% ammonium sulphate, and then bringing the volume up to 100 ml. The activity of the reconstituted yeast was determined by the Fermentometer test by using 15 mls of this suspension to prepare dough by the method described by Burrows & Harrison in the Journal of the Institute of Brewing, Volume LXV pages 39 tp 45 (January/February 1959). Using the equipment and method described therein, the gas volume after 90 minutes is measured and corrected to a standard pressure of 760 mm. Hg and a standard temperature of 90°C. The value obtained was 142 ml.

When the process was repeated but omitting the silicic acid the activity measured by the same test was 105 ml.

When the process was repeated using yeast strain GB2333, having a nitrogen content of about 7%, the activity obtained when silicic acid was added in the manner described was 128 ml while that obtained when no silicic acid was added was 109 ml.

EXAMPLE 2

The process of Example 1 was repeated except that comminution was achieved solely by extruding the cake through a sieve having apertures of 425 microns in diameter, the resulting strands being broken. The activity on the Fermentometer test of this product was 140 ml, compared to an activity of 98 ml when no silicic acid was added.

EXAMPLE 3

The process of Example 1 was repeated except that the hydrophobic silicic acid was added in an amount of 0.5% by weight based on the dry weight of the yeast by scattering onto the cake before the cake was disintegrated in the macerator. The activity determined in the Fermentometer test for this product was 153 ml, whereas for a product made without the addition of silicic acid the acitivity was 117 ml.

EXAMPLE 4

The process of Example 3 was repeated except that instead of comminuting the yeast in a macerator it was extruded through a sieve as in Example 2, and 0.5% of the silicic acid was added after the extrusion and before drying. The activity of the product measured on the Fermentometer test was 169 ml, whereas when the experiment was repeated by omitting the silicic acid the activity was 120 ml.

I claim:

1. A yeast composition comprising active dried yeast having admixed with it 0.5 to 2% by weight hydrophobic silicic acid, based on the dry weight of the yeast, and a minor amount of a wetting agent.

2. A composition according to claim 1 in which the amount of wetting agent is 0.05 to 2% by weight based on the dry weight of the yeast.

3. A conposition according to claim 2 in which the amounts of hydrophobic silicic acid and wetting agent are each from 0.1 to 0.5% by weight based on the dry weight of the yeast.

4. A composition according to claim 1 in which the wetting agent is a long chain aliphatic ester of an aliphatic hydroxy compound.

5. A composition according to claim 4 in which the wetting agent is (1) an ester of a polyglycerol with a saturated fatty acid, (2) an ester of sorbitan with a saturated $C_{16}$ to $C_{18}$ fatty acid or (3) a polyoxy ethylene derivative of (2).

6. A composition according to claim 4 in which the wetting agent is (1) an ester of a mixture of polyglycerols with a $C_{16}$ to $C_{18}$ fatty acid or mixture of such acids and contains monoester, unesterified fatty acid and higher esters, (2) an ester of sorbitan and isosorbide with a $C_{16}$ to $C_{18}$ fatty acid or mixture of such acids and contains monoester, unesterified fatty acid and higher esters, or (3) a polyoxy ethylene derivative of (2).

7. A composition according to claim 1 in which the yeast is in powdered form.

8. A composition according to claim 1 which has been made by blending the hydrophobic silicic acid with active dried yeast containing the wetting agent.

9. A method of making a yeast composition comprising mixing a minor amount of a wetting agent with moist yeast, converting the yeast into particulate form before or after the mixing, drying the product to form active dried yeast, and then blending this with 0.05 to 2% by weight hydrophobic silicic acid based on the dry weight of the yeast.

10. A process of making a dough using active dried yeast in which the active dried yeast is reconstituted in the presence of water 0.05 to 2% by weight hydrophobic silicic acid, based on the dry weight of the yeast, and a minor amount of a wetting agent, and the reconstituted yeast is mixed with flour in the presence of water.

11. A process according to claim 10 in which the active dried yeast is introduced in the form of a composition comprising active dried yeast having admixed with it 0.05 to 2% by weight hydrophobic silicic acid, based on the dry weight of the yeast, and a minor amount of a wetting agent.

* * * * *